UNITED STATES PATENT OFFICE.

ALBERT KOCH, OF BERNAU, GERMANY, ASSIGNOR TO CHEMISCHE FABRIK VON MAX JASPER, OF SAME PLACE.

MANUFACTURING DURABLE INCANDESCENT BODIES.

SPECIFICATION forming part of Letters Patent No. 634,984, dated October 17, 1899.

Application filed December 31, 1897. Serial No. 65,173. (No specimens.)

*To all whom it may concern:*

Be it known that I, ALBERT KOCH, a subject of the King of Würtemberg, residing at Bernau, in the Kingdom of Prussia, Germany, have invented new and useful Improvements in the Manufacture of Durable Incandescent Bodies of which the following is a specification.

This invention relates to a new process for manufacturing very durable incandescent bodies, such as mantles, and it is characterized by the impregnation of any kind of incandescent bodies in an ashed and not-ashed condition with alcoholic and volatile solutions or mixtures of such organic silicium compounds which when burned form a residue of silicic acid (dioxid of silicon) and produce thus in a purely chemical way a strong skeleton containing as a main substance silicic acid. This impregnation may be carried out with the ashed or not-ashed incandescent body or mantles. It is only necessary that it is ignited immediately after the impregnation—that is to say, in a wet condition and exposed to glowing heat. The silicic acid set free by the inflammation of the organic silicium compounds adherent to the incandescent bodies combines in the glowing heat with one or more constituents of the ash, so as to form an elastic and very resisting material. The impregnation of already-ashed incandescent bodies may be carried out several times, so that finally a completely-hard-ash skeleton is formed; but hitherto a single impregnation or incorporation of the silicic acid has been found in practice completely sufficient, even when the incandescent body applied to the burner was exposed to the greatest commotions imaginable.

As concerns the silicium compounds fit for the impregnation process, I remark that all organic silicium compounds may be used (in first-line esters and alkyls) which are combustible and form in burning dioxid of silicium. For practical and economical reasons silicium alkyls are, on account of their, for the most part, complicated and expensive manufacture, not so suitable as silicium esters, which I produce by the action of chloroform of silicium ($SiHCl_3$) on alcohol and also by treating alcohols (methyl, ethyl, amyl, &c.) with chlorid of silicium ($SiCl_4$). For instance, the treatment of an incandescent body already ashed which has proved particularly rational may be carried out as follows: The ordinary incandescent body is burned in the usual way, somewhat shaped by means of pressed gas, and forms thus the known very fragile ashed incandescent body. This body is then fixed to a hook and entirely dipped into a cylindrical sufficiently large vessel containing a mixture, say, of amylic ether of silicium with amyl alcohol. After a short space of time the body is withdrawn, ignited at once, and glowed. The impregnation is carried out exactly in the same manner with the other organic silicium compounds in question.

Owing to the whole moistening above described of the incandescent body with the silicium compound the silicic acid produced by burning is uniformly distributed through the whole ash-body and by a short but strong glowing the new durable body is produced.

I claim—

The process substantially as hereinbefore described of manufacturing durable incandescent bodies, which consists in impregnating the incandescent bodies with alcoholic and etheric solutions of organic silicium compounds, and exposing said impregnated bodies to a glowing heat, setting free silicic acid (dioxid of silicium) which combines therewith to form an elastic and resisting body.

In testimony whereof I have signed my name to this specification in the presence of two subscribing witnesses.

ALBERT KOCH.

Witnesses:
   OTTO HERING,
   MAX JASPER.